United States Patent [19]

Yntema

[11] Patent Number: 4,976,980

[45] Date of Patent: Dec. 11, 1990

[54] METHOD FOR THE CYCLIC PREPARATION OF A LENGTH OF CURDS AND INSTALLATION FOR CARRYING OUT THIS METHOD

[75] Inventor: Everardus G. M. Yntema, Bolsward, Netherlands

[73] Assignee: Stork Friesland B.V., Gorredijk, Netherlands

[21] Appl. No.: 431,579

[22] Filed: Nov. 3, 1989

[30] Foreign Application Priority Data

Nov. 4, 1988 [NL] Netherlands ............... 8802715

[51] Int. Cl.$^5$ .................. A01J 25/00; A23C 19/00
[52] U.S. Cl. .................. 426/495; 99/456; 99/460; 426/512
[58] Field of Search ............ 426/478, 495, 512; 99/456, 458, 459, 460, 454; 425/311, 398, 436 R

[56] References Cited

U.S. PATENT DOCUMENTS

| | | | |
|---|---|---|---|
| 3,468,026 | 9/1969 | Robertson et al. | 99/454 |
| 4,137,836 | 2/1979 | Megard | 99/456 |
| 4,237,781 | 12/1980 | Charles | 99/458 |
| 4,539,902 | 9/1985 | Brockwell et al. | 99/456 |

*Primary Examiner*—George Yeung
*Attorney, Agent, or Firm*—Nilles & Nilles

[57] ABSTRACT

In the cyclic preparation of a length of curds by draining a mixture of whey and curds in an upright column, formed by a permeable casing, the preparation cycle consists of at least three parts: a thickening phase and an extrusion phase from the column and a lateral discharge phase of the length of curds. The mixture is supplied to one end of the casing and a length of the thickened mass of curds is removed periodically at the other end of the casing. The whey/curds column inside the casing is moved forwards at slow speed in the longitudinal direction of the casing during the thickening phase of the preparation cycle, the thickening phase and the extrusion phase taking place at the same time. The discharge phase of the cycle takes place when the column is stationary, within a time span which is less than 20% of the thickening phase and extrusion phase.

10 Claims, 1 Drawing Sheet

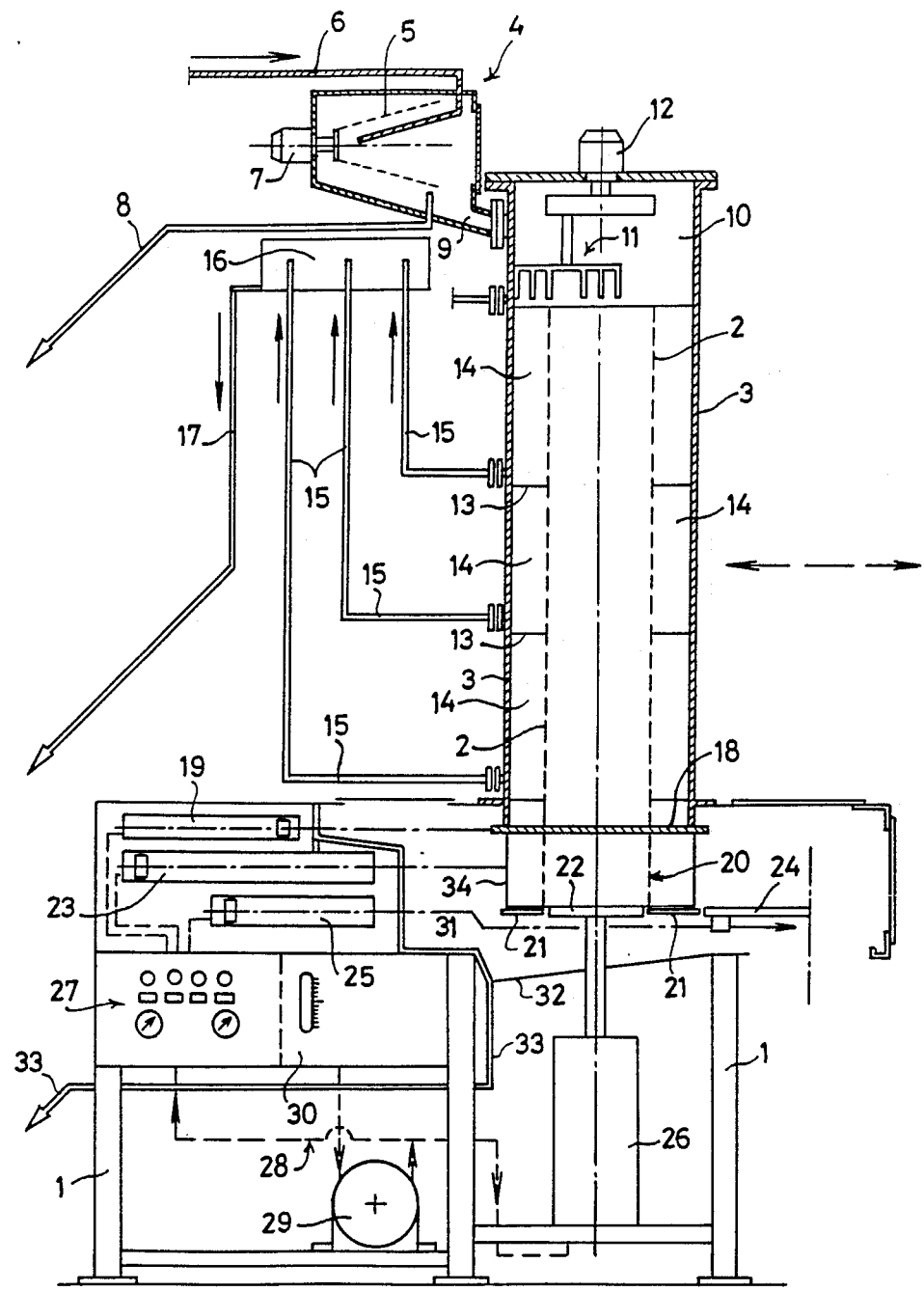

METHOD FOR THE CYCLIC PREPARATION OF A LENGTH OF CURDS AND INSTALLATION FOR CARRYING OUT THIS METHOD

BACKGROUND OF THE INVENTION

1. Field of the Invention

The invention relates to a method for the cyclic preparation of a length of curds by draining a mixture of whey and curds in an upright column, formed by a permeable casing, which preparation cycle consists of at least three parts: a thickening phase and an extrusion phase from the column and a lateral discharge phase of the length of curds, the mixture being supplied to one end of the casing and a length of the thickened mass of curds being removed periodically at the other end of the casing.

2. Description of the Related Art

A method of this type is known in a number of variants and two main categories can be differentiated:

I. the method in which the whey-curbs mixture is supplied to the top end of each casing and the thickened length of curds is cut off and removed at the bottom end;

II. the method in which the whey-curbs mixture is supplied to the bottom end of each casing and the thickened length of curds is cut off and removed at the top end of the casing.

The first of the two main categories mentioned above can be further subdivided into two systems:

A. the method in which all the casings are firmly fixed and the moving parts, such as a temporary closure plate, a cut-off blade and conveyor means for the length of curds cut off, are located exclusively at the bottom edge of each casing;

B. the method in which a number of permeable casings are arranged in a ring and are jointly rotatable about a vertical centre line passing through the centre of the ring, which casings act in conjunction with a stationary table top.

Each of these known processes has the limitation that the cutting-loose and removal of the length of curds must be carried out with some caution in connection with the vulnerability of the thickened curds material. Therefore, in each known method a significant portion of the cycle time is spent on cutting off and removing the length of curds. This means that only a fraction (at most just over half) of the cycle time, which is, for example, 30 to 40 sec, remains for the actual drainage of the whey-curbs mixture.

SUMMARY OF THE INVENTION

The invention aims to provide a method in which a greater part of the cycle time is available for the drainage, or, in other words, a smaller part of the cycle time is required for the (unproductive) cutting off and removal of the length of curds. This feature is achieved in the proposed novel method in that the whey-curbs column inside the casing is moved forwards at slow speed in the longitudinal direction of the casing during the thickening phase of the preparation cycle, the thickening phase and the extrusion phase taking place at the same time, and in that the discharge phase of the cycle takes place when the column is stationary, within a time span which is less than 20% of the entire cycle time of the thickening phase and extrusion phase.

A significant advantage of the proposed novel method is that the ever-present risk of blockage of the inner wall of the permeable casing by curds particles and the resultant hindrance of the removal of whey is reduced or rendered impossible as a consequence of the permanent forwards movement of the whey-curbs column inside the casing. The proposed novel method therefore has two aspects which are important for the cheese manufacturer, namely an improvement in the productive section of the work cycle and the increase in an effective drainage of the whey-curbs column.

The favourable aspect of the method can also be further increased if the supply of the untreated whey-curbs mixture is maintained during the entire thickening phase and extrusion phase, such that the permeable casing is always completely filled.

The invention is also embodied in an installation which, in a known manner, comprises a frame with at least one upright, permeable casing arranged herein, which casing is surrounded by a closed tube and each casing is provided with means:

for the supply of the whey-curbs mixture to one end of the casing, and for the periodic removal of the outermost portion of the mass of curds, thickened inside the casing, at the other end of the casing.

An installation of this type is known in the same variants as already indicated in the initial paragraphs of this description. According to the invention, this installation differs in that each casing acts in conjunction with means for moving forward the whey-curbs column located inside the casing in the time span between two successive operating phases of the discharge means.

Finally, the fact that the forward movement of the whey-curbs column inside the casing can take place in an interrupted manner during the thickening phase and extrusion phase, but also in a manner with which short-term changes in speed, for example a stepwise movement, shocks or vibrations, are employed, can also be mentioned as an important element of both the novel proposed method and the novel installation. Under certain circumstances, the lastmentioned feature can be beneficial for yet further preventing blockages along the inner wall of the permeable casing.

BRIEF DESCRIPTION OF THE DRAWING

The invention will be explained in more detail with reference to the drawing, which shows, schematically, a single installation in vertical cross-section, which installation makes possible a method belonging to the category I, A as defined above.

DESCRIPTION OF THE PREFERRED EMBODIMENT

The installation shown consists of a frame 1 in which an upright, permeable casing 2, surrounded by a closed tube 3, is mounted. The figure shows only a single casing 2, but it is self-evident that the installation can be provided with an arbitrary number of casings, depending on the intended capacity and the nature of the intended length of curds. The latter aspect, of course, in turn depends on the type of cheese that the manufacturer wishes to produce.

The casing 2 is provided with supply means 4 for supplying the whey-curbs mixture to the top end of the casing. These supply means consist of a rotary, conical sieve 5, into the centre of which a supply pipe 6 for the mixture opens. The sieve is driven by a motor 7 and a first portion or quality of the whey will flow away via the sieve 5. This first quantity of whey is then fed via a first discharge pipe 8 to a collection vessel (not shown). The remaining whey-curbs mixture can then pass via the connecting pipe 9 into the uppermost compartment 10 of the tube 3. In this uppermost compartment 10 there is a rotating and turning mixing element 11, driven by a motor 12, for the uniform distribution of the mixture supplied at the inlet of the casing 2.

The annular space between the casing 2 and the tube 3 is divided by means of a few horizontal partitions 13 into three counter-pressure spaces 14 which are located above one another and each of which is connected via a riser 15 to a trough 16 located approximately at the level of the uppermost compartment 10. The whey collecting in this trough 16 can flow away via a second discharge pipe 17 to the collecting vessel (not shown). With the aid of the counter-pressure spaces 14, the drainage of the whey-curbs column located inside the casing 2 can be controlled such that a length of curds of the desired consistency can be obtained at the bottom end of the casing 2.

The bottom end of the casing 2 can be closed with a removal means which includes a slidable plate 18, cylinders 19, 23 and auxiliary basket 20. The plate 18 constitutes a cutting means which can be moved with the aid of an actuating cylinder 19. The tube 3 also ends at this level and the auxiliary basket 20 with a perforated wall can be placed temporarily in the extension of the casing 2 and beneath the plate 18. This basket rests on an auxiliary table 21, in which there is an opening which is somewhat smaller than the internal circumference of the auxiliary basket 20. In the situation shown in the drawing, this opening is closed by a moving means in the form of a platform 22, without top face of this platform being located inside the auxiliary basket 20. This top face is at the same level as the auxiliary table 21.

The auxiliary basket 20 can be moved to the right (in the drawing) by means of the actuating cylinder 23 in order by this means to arrive at a conveyor table 24, which, in turn, can be moved by an actuating cylinder 25.

The platform 22 can be raised and lowered with the aid of an actuating cylinder 26. The separate movements of the plate 18, the auxiliary basket 20, the platform 22 and the conveyor table 24, which will be described below, are effected by the cylinders 19, 23, 25 and 26 with the aid of a control means comprising control system 27, which is indicated schematically. The said control system is integrated in a hydraulic circuit 28, comprising a pump 29 and an oil reservoir 30. A wall structure 32 defines a space 31 around the bottom end of the casing 2 and the tube 3 is designed as a receptacle for whey fluid which has leaked out and leads via a third discharge pipe 33 to the collecting vessel (not shown).

The proposed novel method, that is to say the cyclic preparation of a length of curds, can be carried out as follows with the aid of the installation just described:

In the starting position of the installation, that is to say after the delivery of a cut-off length of curds has been completed, the casing 2 is completely filled with the whey-curbs mixture, which is continuously supplied via the supply 4. The plate 18 is completely in the drawn-back position to the left in the drawing, outside the tube 3, and the platform 22 is in the raised state, that is to say at the level of the (no longer present) plate 18.

At this point in time, an empty auxiliary basket 20, which consists solely of a perforated outer wall, is at the position indicated in the drawing and in this position rests on the auxiliary table 21, the top edge of the basket 20 being closed off by the raised platform 22.

Via the control system 27, the platform 22 is now moved downwards at very low speed, during which movement the whey-curds column is rotated inside the casing 2 while at the same time an extrusion of the entire column takes place, the lowest and most thickened portion of the column gradually being fed inside the auxiliary basket 20.

This downwards extrusion phase is complete as soon as the platform 22 is in its lowest position, which is that shown in the drawing, and the platform is at the same level as the auxiliary table 21. At this point in time the actuating cylinder 19 moves the plate 18 towards its position shown in the drawing and the curds column is cut through and the whey-curbs column above this point comes to rest.

Directly after this, the cylinder 23 is actuated with which the auxiliary basket 20 filled with the intended length of curds is moved by an impact element 34 to the conveyor table 24.

The impact element 34 and the cylinder 23 return to their initial position shown in the figure, after which an empty auxiliary basket 20 is brought, via a feed which is not shown, into its correct position beneath the plate 18 and in the extension of the casing 2.

The preparation cycle is completed by rapidly raising the platform 22 and pulling the plate 18 back again; the cycle is then repeated etc.

Compared with the state of the art, the proposed novel method has the advantage that a very large proportion (at least 80%) of the entire preparation cycle can be used for the drainage of the whey-curbs column. This signifies an increase in capacity compared with the conventional method for the same investment in machines. A second important advantage is the resulting reduction in the blocking phenomenon of the permeable wall of the casings as a consequence of the continuous movement of the whey-curbs column. This latter feature provides an increase in the drainage capacity.

In the above description of the preparation cycle it was assumed that the downwards movement of the platform 22 on which the whey-curbs column is resting takes place uniformly and uninterrupted. However, it is possible to install extra elements (not shown) in the hydraulic circuit 28 in order to generate short-term changes in speed of the platform 22. For example, the lowering of the whey-curbs column inside the casing 2 can take place stepwise or by means of shocks or vibrations in order in this way to stop any blockage which may arise in the permeable wall of the casing 2 as it starts.

Up to now the proposed novel method has been discussed with reference to the drawing, which shows an installation of category I described above. The proposed novel principle, that is to say allowing the thickening phase and the extrusion phase to coincide, can also be applied in an installation from category II, in which case the movable plate 18, the auxiliary basket 20 and the auxiliary table 21 as well as the impact element 34 are located at the top end of the permeable casing. The forward movement of the whey-curbs column within the casing is then obtained by supplying the whey-curbs mixture under excess pressure at the bottom end of the casing, in a manner such as is described in Netherlands patent Application No. 7003851 for the traditional method.

I claim:

1. A method for cyclic preparation of a length of curds by draining a mixture of whey and curds placed in at least one longitudinal permeable casing wherein each length of curds is produced by an entire preparation cycle that has at least a thickening phase, an extrusion phase and a discharge phase, said method comprising the steps of:
   A. supplying said mixture of whey and curds to one end of said casing to form a whey-curds column inside said casing;
   B. supporting said whey-curds column on a platform at the other end of said casing that is movable longitudinally of said casing toward and away from said other end;
   C. moving said platform and whey-curds column away from said one end of the casing during said thickening phase while removing whey therefrom to form a thickened mass of curds in said whey-curds column at said other end of said casing;
   D. extruding said thickened mass of whey-curds column from said other end of the casing during said extruding phase until a desired length of curds is achieved;
   E. removing said desired length of curds during said discharge phase by causing a cutting means to pass through said whey-curds column to momentarily stop the extruding movement of said whey-curds column and cut off said desired length of curds while leaving a cut end surface of said curds momentarily supported by said cutter means;
   F. discharging said cut off desired length of curds from said platform during said discharge phase;
   G. withdrawing said cutter means; and
   H. moving said platform back into supporting engagement with said cut end surface.

2. The method according to claim 1 wherein said removing, discharging, withdrawing and moving steps E, F, G and H are performed during a time span which is less than 20% of the total time required to complete said entire preparation cycle for each length of curds.

3. The method according to claim 1 wherein the step A said supply of mixture is continuously maintained so that said permeable casing is always completely filled.

4. The method according to claim 2 wherein said time span is 10 to 15% of the total time required to complete said entire preparation cycle for each length of curds.

5. The method according to claim 1 wherein the step C whey is removed from essentially the entire length of said casing.

6. The method according to claim 1 wherein in step C movement of said whey-curds column during said thickening and extrusion phases is uninterrupted.

7. An apparatus for performing a preparation cycle to produce a length of curds from a whey-curds mixture comprising:
   at least one longitudinal permeable casing having spaced apart ends;
   a closed tube surrounding said casing in spaced relation thereto;
   supply means for the supply of said whey-curds mixture to one end of said casing;
   moving means mounted at the other end of said column for supporting said whey-curds column and moving said whey-curds column longitudinally toward the other end of said casing while whey is removed to form a thickened mass of curds in said whey-curds column which is extruded from the other end of said casing during operation;
   removal means including cutting and discharge means for periodically cutting and discharging a length of curds from said thickened extruded whey-curds column; and
   control means for controlling said moving means and removal means during said preparation cycle so that said moving and removal means are operative during a time span which is less than 20% of the total preparation cycle time.

8. An apparatus according to claim 7 wherein:
   said casing is positioned vertically and said one end is at the top of said casing and said other end is at the bottom of said casing;
   said supply means for said whey-curds mixture are located at said top end of said permeable casing;
   said removal means for cutting off and removing the extruded length of the curds are positioned at said bottom end;
   said moving means for moving the whey-curds columns comprises a vertically movable supporting platform at the bottom end of the casing; and
   hydraulic actuating cylinder means are connected to control the movement of both said platform and said means for cutting off and removing said length of curds.

9. An apparatus according to claim 8 wherein said moving means for moving the whey-curds column include means for generating different types of movement of said platform including speed, stepwise movements, shocks and vibrations and for changing said type of movement which said whey-curds column is subjected to during operation.

10. A method for cyclic preparation of a length of curds by draining a mixture of whey and curds place in at least one longitudinal permeable casing wherein each length of curds is produced by an entire preparation cycle that has at least a thickening phase, an extrusion phase and a discharge phase, said method comprising the steps of:
   A. supplying said mixture of whey and curds to one end of said casing to form a whey-curds column inside said casing;
   B. supporting said whey-curds column on a platform at the other end of said casing that is movable longitudinally of said casing toward and away form said other end;
   C. moving said platform and whey-curds column away from said one end of the casing during said thickening phase while removing whey therefrom to form a thickened mass of curds in said whey-curds column at said other end of said casing;
   D. extruding said thickened mass of whey-curds column from said other end of the casing during said extruding phase until a desired length of curds is achieved;
   E. removing said desired length of curds by causing a cutting means to pass through said whey-curds column to momentarily stop the extruding movement of said whey-curds column and cut off said desired length of curds while leaving a cut end surface of said curds column momentarily supported by said cutter means;
   F. discharging said cut off desired length of curds from said platform during said discharge phase;
   G. withdrawing said cutter means;
   H. moving said platform back into supporting engagement with said cut end surface; and
   I. performing said removing, discharging, cutting and moving steps E, F, G and H during a time span which is less than 20% of the total time required to complete said entire preparation cycle for each length of curds.

* * * * *